United States Patent
Hou

(10) Patent No.: US 7,721,813 B2
(45) Date of Patent: May 25, 2010

(54) IMPLEMENT/HITCH DRAFT CONTROL USING HITCH CYLINDER PRESSURE AS LOAD FEEDBACK

(75) Inventor: Yanming Hou, Pleasant Prairie, WI (US)

(73) Assignee: CNH America LLC, New Holland, PA (US)

( * ) Notice: Subject to any disclaimer, the term of this patent is extended or adjusted under 35 U.S.C. 154(b) by 675 days.

(21) Appl. No.: 11/467,950

(22) Filed: Aug. 29, 2006

(65) Prior Publication Data

US 2008/0066934 A1 Mar. 20, 2008

(51) Int. Cl.
*A01B 63/112* (2006.01)
(52) U.S. Cl. .......................... 172/7; 172/239
(58) Field of Classification Search .............. 172/7, 172/9, 10, 677, 317, 239
See application file for complete search history.

(56) References Cited

U.S. PATENT DOCUMENTS

| | | | |
|---|---|---|---|
| 2,640,353 A | 6/1953 | Hefner | |
| 3,269,464 A * | 8/1966 | Smelcer | 172/10 |
| 3,374,842 A * | 3/1968 | Smith, Jr. | 172/9 |
| 3,375,876 A * | 4/1968 | Engelmann | 172/1 |
| 3,439,709 A * | 4/1969 | Bernhoft et al. | 137/596.13 |
| 3,628,610 A | 12/1971 | Morkoski | |
| 3,731,744 A | 5/1973 | Lipinski | |
| 3,731,745 A | 5/1973 | Koch | |
| 3,795,415 A * | 3/1974 | Koch et al. | 172/677 |
| 3,990,520 A | 11/1976 | Koch et al. | |
| 4,023,646 A * | 5/1977 | Heisig et al. | 180/421 |
| 4,057,109 A | 11/1977 | Nelson | |
| 4,350,209 A * | 9/1982 | O'Connor | 172/7 |
| 4,446,924 A * | 5/1984 | Dietrich, Sr. | 172/140 |
| 4,637,474 A | 1/1987 | Leonard | |
| 4,807,136 A | 2/1989 | Rutkowski et al. | |
| 4,846,283 A * | 7/1989 | Batcheller | 172/10 |
| 6,052,925 A | 4/2000 | Reiners | |
| 6,230,817 B1 * | 5/2001 | Haugen | 172/7 |
| 6,830,110 B2 * | 12/2004 | Schlesser et al. | 172/8 |
| 2006/0016609 A1 | 1/2006 | Chauvel | |
| 2006/0108127 A1 * | 5/2006 | Batthala et al. | 172/2 |
| 2008/0053669 A1 * | 3/2008 | Hou et al. | 172/3 |

FOREIGN PATENT DOCUMENTS

DE 3530817 3/1987

* cited by examiner

*Primary Examiner*—Thomas B Will
*Assistant Examiner*—Jamie L McGowan
(74) *Attorney, Agent, or Firm*—Patrick M. Sheldrake; John William Stader; Michael G. Harms

(57) ABSTRACT

A draft load control system for a primary motive power source that uses hitch cylinder pressure to provide input to the control system of the draft load on the power source caused by a hitch-connected or a towed, ground-engaging implement.

16 Claims, 4 Drawing Sheets

IMPLEMENT/HITCH DRAFT CONTROL USING HITCH CYLINDER PRESSURE AS LOAD FEEDBACK

BACKGROUND OF THE INVENTION

The present invention relates generally to hydraulically actuated implements attached to agricultural tractors or other primary sources or motive power, and more particularly to systems and methods for controlling the draft load of an implement in such an arrangement.

One of the most common uses of agricultural tractors is to move implements through agricultural fields to cultivate and condition the soil. Implements are commonly connected to the tractor using a three-point hitch or a drawbar. A three-point hitch device typically comprises two bottom lift arms, to which the implement is connected in rotary manner to swing about a given hinge axis; and a top link interposed between the tractor frame and the implement to control the angular position of the implement about the hinge axis. The lift arms are moved by a further actuating cylinder (or cylinders) interposed between the tractor frame and the lift arms, movement of the lift arms raising and lowering the implement with respect to the ground. Three-point hitches may be front or rear mounted. Implements may thus be connected in front of the tractor and pushed through the soil, behind the tractor and pulled through the soil, or both. Similarly most trailed implements towed by a drawbar include one or more wheels pivotably connected to the implement in a manner to raise and lower the implement with respect to the ground offering an another method for altering implement position. Movement of the implement-attached wheels is used to establish implement position with respect to the ground. Three-point hitches and towed implement position control, as well as numerous variations thereof, are well known in the agricultural industry.

The digital controller used for hitch controller 200 and other digital controllers used in the tractor are coupled over the CAN bus 180. Engine control system 161 also includes a digital interface that enables it to communicate over the same CAN bus. The communications bus (CAN bus) 180 is preferably a controller area network bus such as the bus defined in the SAE J1939 standard. Individual communications circuits within the communications bus 180 are preferably Siemens or Motorola brand CAN bus controller circuits that are either integrally formed with the controllers or are coupled to the controllers. By using the existing CAN bus 180, the present invention obtains the sensor information without the need to employ additional, task-specific sensing circuits. These preferences are based upon actual field test results, and reflect choices made thereon. However, it should be obvious that components other than these will work, and certainly improvements by other manufacturers will be made and may prove even more suitable than those specifically identified herein. Additionally, while a serial communications protocol is described, use of other protocols (e.g., parallel) are equally suitable and thus not precluded by this invention.

Electronic draft control systems alleviate the need for manual hitch adjustments by controlling the position of the connected implement in response to loads applied to the tractor by the implement. The control systems allow the depth of engagement to be adjusted so that a near constant draft load is applied to the tractor to smooth tractor operation. Alternatively, control systems may maintain the implement at a near constant depth of engagement thereby allowing the implement tools to follow field contours. Such control systems typically use one or more measuring devices to sense the draft loads applied to the hitch by the implement and then generate a control output to adjust the hitch position in response to the applied loads and desired position. Measuring devices are subjected to generally harsh environments that increase failure rates and reduce reliability. Such force sensing devices are typically installed only on rear three-point hitches which limit the draft control to rear hitched implements.

Key considerations in monitoring implement draft load are the accuracy of the load reading and the time lag between an actual change in the draft load and the recognition of that change by the control system. Sensing devices capable of providing accurate and near-instantaneous measurements of the draft load are expensive, susceptible to electrical noise interference from the tractor and may be limited in their capacity.

Hitch mounted implements are supported by the actuating cylinders used to position three-point hitches. Actuating cylinders must provide an upward force on the hitch to support the implement above the ground. When the implement engages the ground and is towed through a field, a downward force is generated which must be counteracted by the actuating cylinders to maintain the implement at a constant depth of engagement. Measuring the cylinder pressure provides an efficient, near instantaneous method for measuring the downward force created by the implement. Actuating cylinders used to position support wheels in towed implements experience similar loading characteristics and may therefore be similarly used to determine downward loading on the implement.

It would be a great advantage to provide an economical and reliable system for controlling the depth of ground engagement and therefore the draft load imposed on the tractor by the coupled implement in a manner to maintain a constant draft load on the tractor. Further advantages would be realized if the draft load control system would function for any connected implement regardless of whether the implement is connected to a front hitch or a rear hitch. Still further advantages would be realized if the draft load sensing apparatus provided near-instantaneous measurements of the draft load to the control system thereby enabling automated draft control thereby alleviating the operator from manually monitoring and controlling the draft load. Still further advantages would be realized if the draft load control system could accept other parameters, such as engine load, to further refine the draft load control scheme. These and other advantages are provided by the draft control system described below.

SUMMARY OF THE INVENTION

Accordingly, it is an object of the present invention to provide a hitch draft load measuring apparatus for a hitch control system of a source of primary motive power that adjusts hitch position to maintain a more constant draft load on the power source.

It is a further object of the present invention to provide a hitch draft load measuring apparatus that provides accurate draft load measurements to a hitch control system for a tractor.

It is a further object of the present invention to provide a hitch draft load measuring apparatus that provides near-instantaneous draft load measurements to a hitch control system for a tractor.

It is a still further object of the present invention to provide a draft load measuring apparatus that is suitable for use on front hitched, rear hitched, or drawbar towed implements.

It is a still further object of the present invention to provide an economical hitch draft load measuring apparatus for an automated draft control system in a tractor that maintains a constant draft load on the tractor thereby increasing tractor efficiency and quality of ground conditioning.

It is a still further object of the present invention to provide a hitch draft load measuring apparatus for a tractor draft control system that is durable in construction, inexpensive of manufacture, carefree of maintenance, easily assembled, and simple and effective to use.

These and other objects are achieved by providing a draft load control system for a primary motive power source (tractor) that uses hitch or implement positioner cylinder pressure to provide input to the control system of the draft load on the tractor caused by a connected, ground-engaging implement.

BRIEF DESCRIPTION OF THE DRAWINGS

The advantages of this invention will be apparent upon consideration of the following detailed disclosure of the invention, especially when taken in conjunction with the accompanying drawings wherein.

DESCRIPTION OF THE PREFERRED EMBODIMENT(S)

Many of the fastening, connections processes and other means and components utilized in this invention are widely known and used in the field of the invention described, and their exact nature or type is not necessary for an understanding and use of the invention by a person skilled in the art, and they will not therefore be discussed in significant detail. Also, any reference herein to the terms "left" or "right," "up" or "down," or "top" or "bottom" are used as a matter of mere convenience, and are determined by standing at the rear of the machine facing in its normal direction of travel. Furthermore, the various components shown or described herein for any specific application of this invention can be varied or altered as anticipated by this invention and the practice of a specific application of any element may already be widely known or used in the art by persons skilled in the art and each will likewise not therefore be discussed in significant detail.

Figure 1:
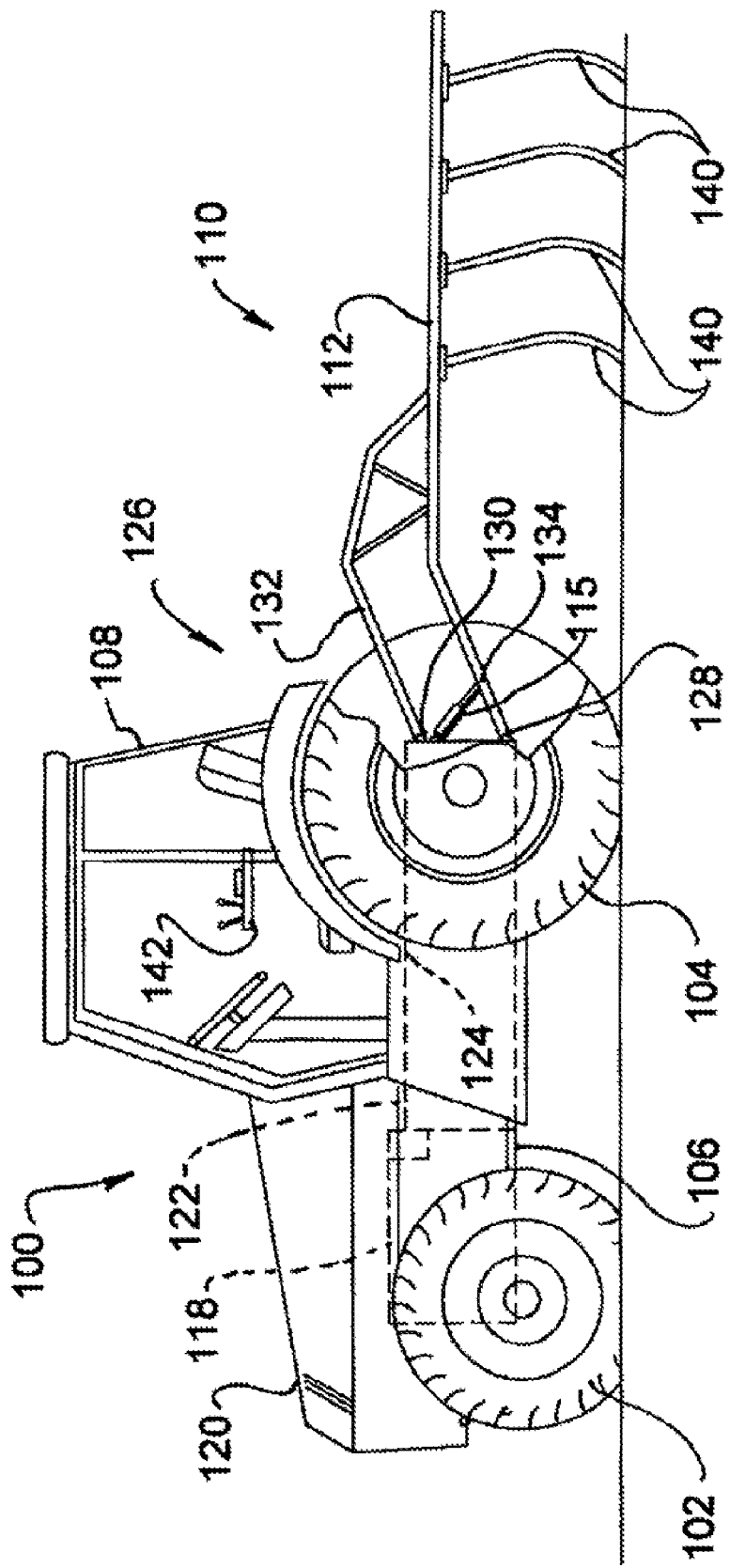
FIG. 1 is a side view of an agricultural tractor coupled to a ground-engaging implement by a three-point hitch in accordance with the present invention.

Referring now to FIG. 1, there is illustrated an agricultural tractor 100 having a pair of front wheels 102, a pair of rear wheels 104, a chassis 106, and an operator's cab 108 from which the tractor can be comfortably operated. The rear wheels 104 of tractor 100 are driven by tractor engine 118, which is disposed under a forwardly extending hood 120 located just in front of the operator compartment 108. A transmission 122 is fixed to the engine and includes a gearbox that provides a plurality of gear ratios. A differential 124 is fixed to the rear of the transmission 122 and transfers power a least a pair of rear wheels 104. Engine 118, transmission 122, and differential 124 collectively comprise chassis 106. In an alternative configuration, a separate frame or chassis may be provided to which the engine, the transmission and the differential are coupled, a configuration common in smaller tractors. Still other tractor configurations may drive all wheels on the tractor, use an articulated chassis to steer the tractor, or rely on tracks in lieu of wheels. The present invention is readily adaptable to most agricultural tractor application regardless of the tractor configuration.

The operator's cab 108 of tractor 100 is disposed toward the rear of the tractor just over and forward of the tractor's three-point hitch 126. Implement 110 is coupled to tractor 100 by three-point hitch 126. Operator control of three-point hitch 126 is accomplished through operator console 142. The position of implement 110 with respect to the ground is controlled by pivoting three-point hitch 126 about its pivotal couplings 128, 130 to tractor 100. Motive force for pivoting the three-point hitch is provided by a hitch position actuator 115 comprised of a hydraulic cylinder extending between the chassis 106 of tractor 100 and the three-point hitch controlled by a hydraulic control valve. Extension and retraction of the position actuators hydraulic cylinder is controlled by a hydraulic control valve (not shown) that receives selective input from the operator console or hitch control system. Operation and control of hydraulic cylinders is well known and not described further herein. When the position actuator 115 is extended and retracted, it raises and lowers links 132, 134. Since implement 110 is coupled to these links at their distal ends, this causes the implement 110 to rise and fall.

Implement 110 has several ground-engaging implements or tools 140 that are coupled to and extend downward from frame 112. These tools may include, for example, plows, rakes, harrows, or other ground cultivating devices. Whenever frame 112 is raised or lowered with respect to the ground by operation of three-point hitch 126, the depth of penetration of tools 140 is also increased or decreased. Thus, whenever hydraulic cylinder 115 extends, tools 140 extend further toward or into the ground. Whenever cylinder 115 retracts, tools 140 move further from, or out of, the ground. As can be expected, changes in depth of penetration of the implement 110 into the ground affect the tractive effort (draft) required of the tractor to pull the implement through the ground. Changes in the vertical forces acting on the implement as it is pulled through the ground affect the pressure of the hydraulic fluid within hydraulic cylinder 115. By monitoring variations in hydraulic fluid pressure in hydraulic cylinder 115, changes in draft load can be easily derived and used as input to a draft control system.

Figure 2:
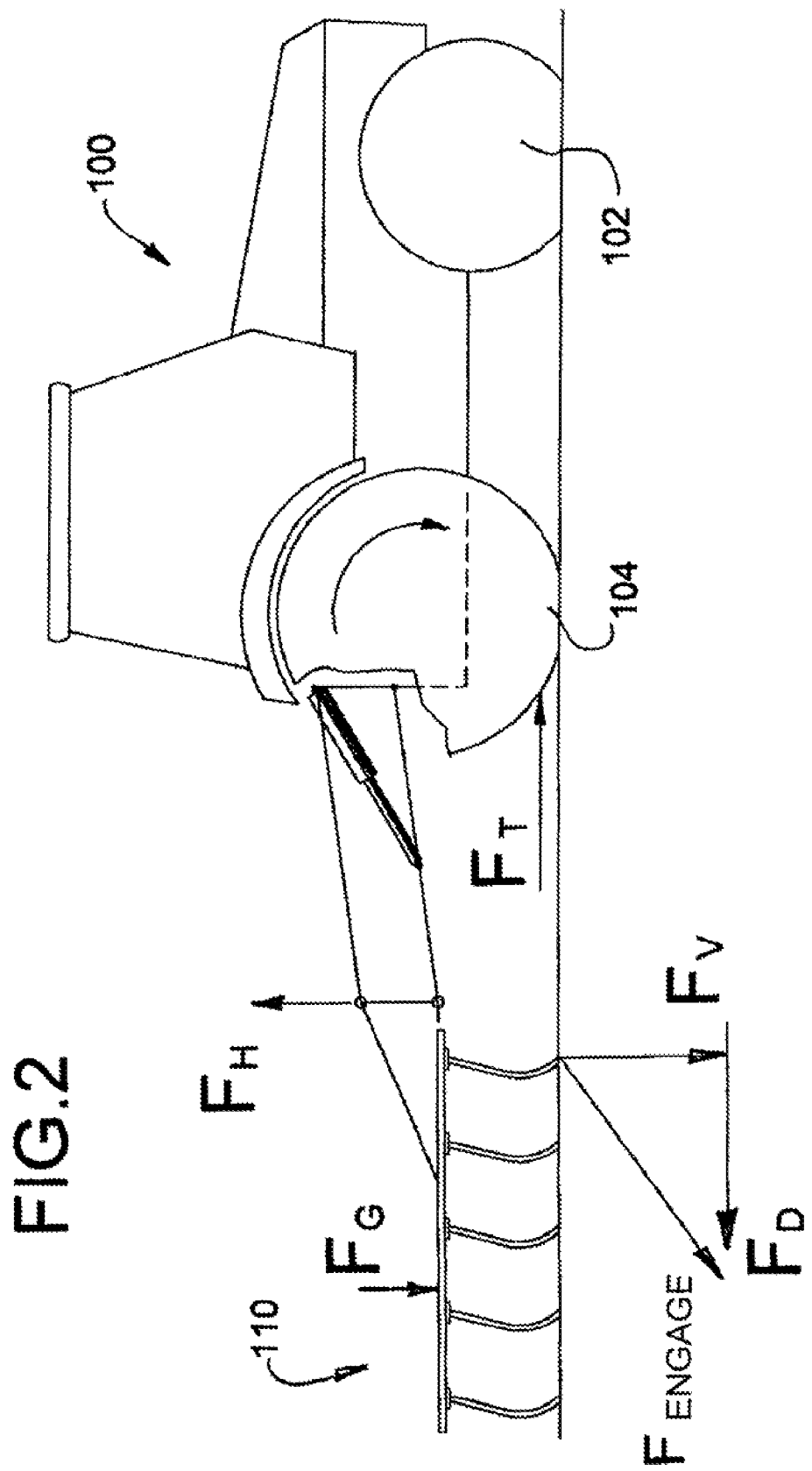
FIG. 2 is a side view of an agricultural tractor coupled to a ground-engaging implement by a three-point hitch showing the various forces acting on the tractor-implement.

FIG. 2 shows a side view of an agricultural tractor coupled to a ground-engaging implement by a three-point hitch with the various forces acting on the tractor-implement indicated by vector arrows. When tractor 100 propels implement 110 through the ground, the ground-engaging tools 140 typically engage the soil at an angle such that the direction of the force imposed upon the implement tool, referred to herein as the engagement force, $F_{ENGAGE}$, is angled with respect to the ground. The horizontal component of the engagement force caused by the interaction between the ground-engaging tools 140 and the ground is the draft force on the tractor, $F_D$. The vertical component of the engagement force is shown in FIG. 2 as a vertical force, $F_V$, which, along with the force of gravity, $F_G$, act on the implement and must be balanced by an opposing force imparted by the hitch, $F_H$. The engagement force, $F_{ENGAGE}$, varies with the depth of engagement of the tools with the ground and with changes in soil hardness, thereby causing changes in the horizontal and vertical components of this force.

Under normal working conditions, the angle between the tool and the soil surface, referred to as the engaging angle, remains substantially constant as the tool 140 moves through the soil. Thus, the horizontal (draft force $F_D$) and vertical ($F_V$) force components remain substantially proportional to one another as the implement traverses along the ground, thereby allowing measurements of one to indicate the value of the other. The vertical position of the hitch is controlled by hydraulic cylinder 115. When the hitch is being maintained in a stationary position (e.g., not being raised or lowered), vertical forces applied to the hitch cause variations in the pressure of the fluid within the hydraulic cylinder. Monitoring the hydraulic fluid pressure in the hydraulic cylinder 115 allows the hitch force, $F_H$, to be accurately and near-instantaneously measured. Assuming a substantially proportional relationship between $F_H$ and $F_D$ allows the draft force to be easily and accurately measured without the use of additional, complex hitch force monitoring devices previously known and used. Direct draft load measurement using the previously know methods requires additional expensive sensing devices that add cost to the tractor and increase failures since the sensors are not well-suited to tractor-induced vibration or exposure to harsh field conditions. In contrast, many tractors currently include sensing mechanisms for hydraulic cylinder pressures such that monitoring draft loads using lift cylinder hydraulic pressure requires few, if any, additional devices or components.

Figure 3:
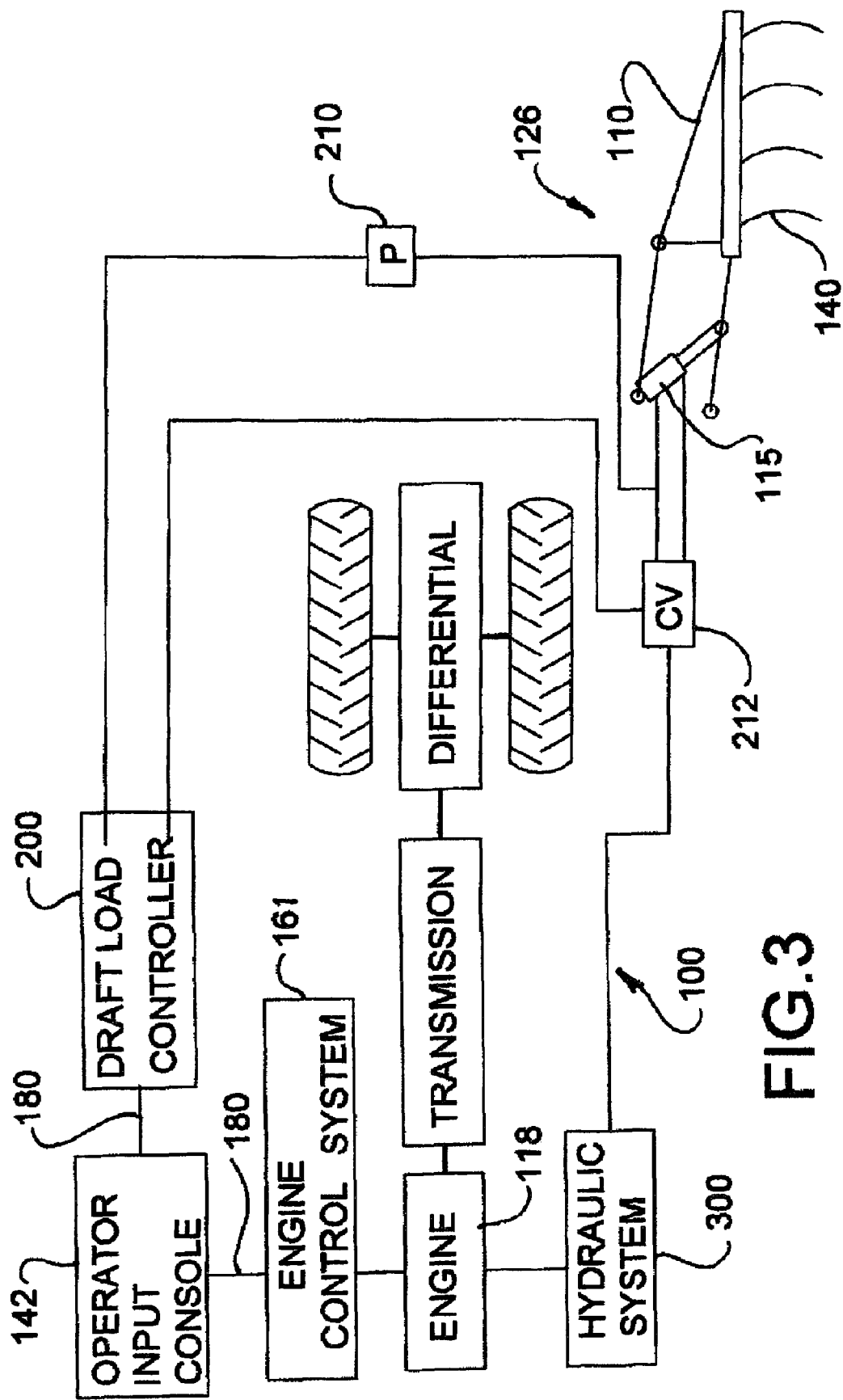
FIG. 3 is a schematic diagram of a typical control system for an agricultural tractor employing a direct measure of draft loads.

FIG. 3 is a schematic diagram of a draft control system for an agricultural tractor 100 in which hitch cylinder pressure is used as input to a draft load controller 200 in accordance with the present invention. In previously known conventional systems, mechanical, hydraulic, electronic, or a combination of these measuring devices were used to monitor the draft loads applied on the tractor 100 by monitoring loads on the three-point hitch 126 resulting from implement 110. In the present invention, hitch cylinder pressure monitor 210 senses the pressure of hydraulic fluid in cylinder 115. As described above, cylinder pressure can be used as an input for the draft load on tractor 100.

The draft load controller 200 can be of numerous types of controller, either analog or digital. The function of hitch controller 200 is to adjust implement position (e.g., height relative to the ground) to maintain a generally constant load on the tractor engine as the implement is pulled through the ground. The operator selects a desired draft load (load command) for pulling implement 110 and enters it at the operator console 142. Hitch controller 200 compares the desired draft load with the then-present draft load, which is derived from the cylinder pressure sensor 210, and generates an error signal based on the difference. Based on the error signal, hitch controller 200 generates a draft control signal to control valve 212 which adjusts cylinder 115 using pressurized fluid from the tractor hydraulic system 300 so that implement 110 will be repositioned thereby causing changes in draft load and returning the draft load to the desired draft load. Through this process, hitch controller 200 is able to maintain a generally constant load on engine 118 as the tractor 100 pulls implement 110 through the ground.

In a preferred embodiment, the draft load controller is digital controller that is incorporated into an integrated tractor control system which includes digital controllers for the engine and other auxiliaries mounted on the tractor. Each of the controllers includes a digital control and communication interface which enables the controllers to communicate over a shared electronic communications bus 180. The communications bus is also referred to herein as a CAN bus. Operator console 142 includes a digital communication interface allowing it to interface with the CAN bus 180. From operator console 142, the operator may select a desired draft load. The inputs are communicated from the operator console 142 via the CAN bus 180 to the draft load controller to establish the desired draft load.

The CAN bus 180 conveys information from a variety of other controllers that enable the draft load to be accurately controlled using numerous existing sensor inputs. Many tractors include hitch cylinder pressure as a monitored parameter. Additionally, hitch cylinder pressure monitoring as an input for draft load control can also be used in conjunction with other draft load control schemes (e.g., drive torque monitoring) to further refine the draft control systems. Since most related controllers communicate via the CAN bus 180, the necessary information is readily available to the draft load controller. Sensor information that is not available on the CAN bus may often be easily added. With a reliable draft load signal, controlling implement position to maintain a substantially constant draft load is a conventional task for the draft load controller 200.

The digital controller used for hitch controller 200 and other digital controllers used in the tractor are coupled over the CAN bus 180. Engine control system 160 also includes a digital interface that enables it to communicate over the same CAN bus. The communications bus (CAN bus) 180 is preferably a controller area network bus such as the bus defined in the SAE J1939 standard. Individual communications circuits within the communications bus 180 are preferably Siemens or Motorola brand CAN bus controller circuits that are either integrally formed with the controllers or are coupled to the controllers. By using the existing CAN bus 180, the present invention obtains the sensor information without the need to employ additional, task-specific sensing circuits. These preferences are based upon actual field test results, and reflect choices made thereon. However, it should be obvious that components other than these will work, and certainly improvements by other manufacturers will be made and may prove even more suitable than those specifically identified herein. Additionally, while a serial communications protocol is described, use of other protocols (e.g., parallel) are equally suitable and thus not precluded by this invention.

Figure 4:
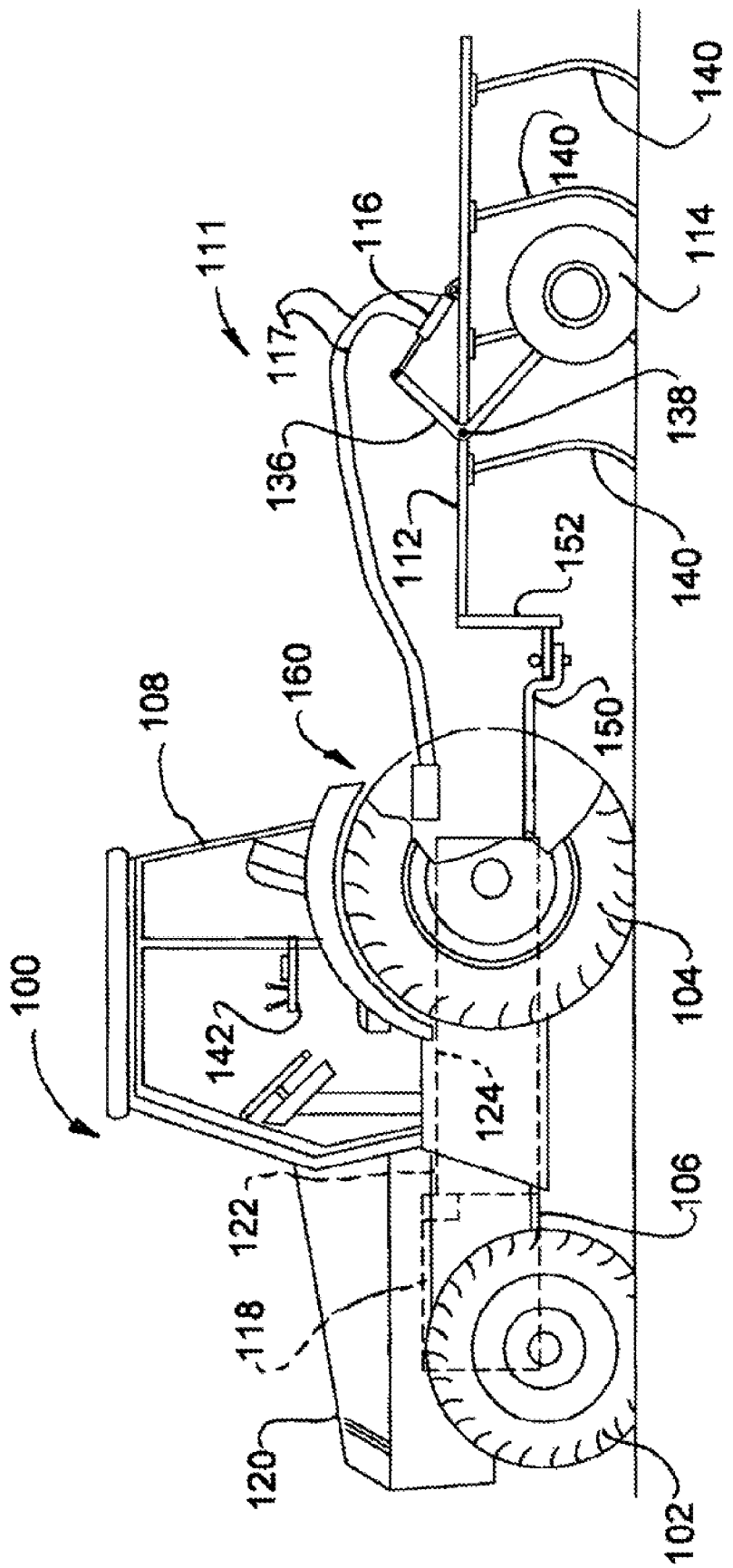
FIG. 4 is a side view of an agricultural tractor towing a ground-engaging implement using a drawbar hitch.

Monitoring hitch cylinder pressure works equally well on front and rear-mounted three-point hitches as well as connected implements. Referring now to FIG. 4; shown is a towed, ground engagement implement for which the present invention may also prove useful. Tractor 100 is shown towing implement 111. Tractor 100 includes drawbar 150 which provides a connection point for hitch 152 on implement 111. Height adjustment and thereby depth of engagement for towed implements cannot be adjusted by positioning the three-point hitch. Instead, the position of towed implements is controlled is by raising and lowering frame 112 with respect to implement wheels 114. Implement wheels 114 are rotationally coupled to a lower end of mechanical link 136. Link 136, in turn, is pivotally coupled to the frame 112 at pivot point 138. Link 136 is coupled to frame 112 to pivot clockwise or counterclockwise with respect to frame 112 about pivot point 138. Link 136 is pivoted by hydraulic cylinder 116, which is coupled to and between the upper end of plate 136 and frame 112. Movement of hydraulic cylinder 116, like hitch position actuator 115, is controlled by a hydraulic control valve 160 connected to hydraulic cylinder 116 by hoses 117. Hydraulic control valve 160, commonly referred to as the AUX valve on agricultural tractors, receives selective input from the operator console or hitch control system. When cylinder 116 extends, it rotates link 136 counterclockwise with respect to the chassis. Due to the rearward angle at which the lower portion of link 136 extends, this counter-clockwise rotation causes wheels 114 to rise upward toward frame 112.

As a practical matter, since wheels 1114 are typically resting on the ground when cylinder 116 is extended and retracted, wheels 114 do not actually "rise" or "fall." Instead, frame 112 rises or falls with respect to the wheels, and hence with respect to the ground. Thus, whenever hydraulic cylinder 116 extends, frame 112 lowers down towards the ground and whenever hydraulic cylinder 116 retracts, frame 112 rises up away from the ground. Using the frame 112 as a reference point, however, one can say that the wheels are "raised" or "lowered." As implement 111 is pulled through the ground, the engagement force created by the tools will tend to increase the depth of engagement. Wheels 114 are therefore required to rest on the ground surface to limit the depth of engagement. As the position of wheels 114 is maintained by cylinder 116, monitoring the hydraulic fluid pressure in cylinder 116 allows the draft load to be determined in the same manner as described for hitch-connected implements above.

It will be understood that changes in the details, materials, steps and arrangements of parts which have been described and illustrated to explain the nature of the invention will occur to and may be made by those skilled in the art upon a reading of this disclosure within the principles and scope of the invention. The foregoing description illustrates the preferred embodiment of the invention; however, concepts, as based upon the description, may be employed in other embodiments without departing from the scope of the inventions.

Having thus described the invention, what is claimed is:

1. A draft load control system for positioning a ground-engaging implement coupled to a vehicle providing a primary source of motive power, said vehicle comprising:

a ground-supported frame having forward and rearward portions; an engine supported on said frame for propelling said vehicle, said coupled implement, and operative components thereof;

a vehicle control communication system; an operator input apparatus, said operator input apparatus accepting a desired draft load value and providing a corresponding desired draft load signal to said vehicle control communication system;

a hydraulic position actuator having a height control cylinder disposed to raise and lower said implement with respect to the ground in response to an implement position control signal;

a hydraulic pressure sensor connected to said hydraulic position actuator and configured for detecting the fluid pressure within the height control cylinder and for providing a pressure output signal representative of the fluid pressure; and an electronic draft load controller connected to said vehicle control communications system configured to receive said pressure output signal and said desired draft load signal from said vehicle control communication system, the controller programmed to derive from the pressure output signal an actual draft load on the vehicle using a proportional relationship between vertical forces on the implement and the draft load, wherein changes in the cylinder fluid pressure reflect variations in the vertical forces and accordingly the draft load, the controller configured to then calculate from the current draft load an implement position control signal and send said implement position control signal to said hydraulic position actuator; the controller further configured to manage said implement position based on said position control signal whereby a substantially constant draft load is maintained on said tractor.

2. The draft load control system of claim 1, wherein said draft load controller is a digital controller, the controller configured to calculate the actual draft load change solely as a function of the pressure output signal while the implement is maintained near an operator desired position.

3. The draft load control system of claim 2, wherein said vehicle control communication system comprises a digital communication link.

4. The draft load control system of claim 3, wherein said hydraulic position actuator is a three-point hitch movable in upward and downward directions, the height control cylinder is connected to the frame and to the three point hitch and configured for raising and lowering the hitch, said implement being connected to said three-point hitch enabling said three-point hitch to raise and lower said implement, said three-point hitch, being responsive to said draft load controller, the draft load controller configured to position the three point hitch to adjust the draft load, wherein the draft load controller is configured to solely derive the actual draft load from a sensed pressure of the cylinder wherein the fluid pressure is used to calculate a balancing force applied by the hitch on the implement, the balancing force generally equal to vertical forces on the implement including the weight of gravity, wherein the vertical forces on the implement are proportional to the horizontal draft force.

5. The draft load control system of claim 4, wherein said three-point hitch is mounted on the forward portion of said tractor.

6. The draft load control system of claim 4, wherein said three-point hitch is mounted on the rearward portion of said tractor.

7. The draft load control system of claim 3, wherein said ground-engaging implement is towed behind said vehicle and the hydraulic position actuator is configured such that the height control cylinder is connected to a frame of the implement and to a linkage connected to a ground engaging portion of the implement and configured to raise and lower the ground engaging portion of said implement with respect to the ground, said hydraulic position actuator, being responsive to said draft load controller, causes, when necessary, changes in implement position and actual draft load on said vehicle.

8. A method for controlling the draft load of a ground-engaging implement coupled to a tractor, the method comprising the steps of:

providing a ground-supported tractor having an engine for motive power, an operator's platform, and a hydraulic position actuator movable in upward and downward directions responsive to an implement position control signal;

providing a hydraulic pressure sensor connected directly to the hydraulic position actuator and configured for detecting the cylinder pressure;

providing a ground-engaging implement attached to the tractor and thereby propelled by the tractor;

providing an operator input apparatus at the operator platform to establish a desired draft load value;

providing a vehicle control communication system connected to the operator input apparatus and the hydraulic pressure sensor;

providing a draft load controller connected to the vehicle control communication system;

setting the desired draft load value using the operator input apparatus;

communicating the desired draft load value to the draft load controller via the vehicle control communication system;

operating the tractor to cause the implement to engage the ground thereby creating an actual draft load on the tractor;

generating a hydraulic pressure signal by the hydraulic pressure sensor; communicating the hydraulic pressure signal to the draft load controller via a vehicle control communications system;

determining by the draft load controller a draft load value based on the hydraulic pressure signal, wherein the draft load value is derived from a proportional vertical engagement force between the implement and the ground, the vertical engagement force calculated as a function of the fluid pressure within the cylinder as the cylinder counteracts the vertical forces and maintains the implement near an operator desired position, such that the cylinder fluid pressure is generally proportional to the draft load;

comparing the actual draft load value to the desired draft load value; calculating an error signal based on the difference between the actual draft load value and the desired draft load value;

generating an implement position control signal having a value, communicating the implement position control signal to the hydraulic position actuator; and changing the implement position based on the value of the implement position control signal thereby causing the error signal to be substantially zero and managing a substantially constant draft load on the tractor.

9. The method of claim 8 wherein said draft load controller is a digital controller, the controller configured to calculate the actual draft load change solely as a function of the pressure output signal while the implement is maintained near an operator desired position.

10. The method of claim 9, wherein said vehicle control communications system comprises a digital communications link.

11. The method of claim 8, wherein said implement is coupled to said tractor by a rear-mounted hitch.

12. The method of claim 8, wherein said implement is coupled to said tractor by a front-mounted hitch.

13. The method of claim 8, wherein said implement is coupled to said tractor by a rear-mounted drawbar and towed by said tractor, said hydraulic position actuator being disposed on said implement to raise and lower said implement with respect to the ground, said hydraulic position actuator, being responsive to said draft load controller, causes, when necessary, changes in implement position and actual draft load on said tractor.

14. In an agricultural tractor for pulling a connected ground-engaging implement, said tractor having an engine for propelling said tractor and said implement, an operator input apparatus, position of said ground-engaging implement being varied by a hydraulic position actuator in response to an implement position signal from an implement draft load controller, wherein the improvement comprises:

a digital draft load controller;

a hydraulic pressure sensor connected to directly to said hydraulic position actuator, said hydraulic pressure sensor configured for providing a pressure output signal representative of the fluid pressure in hydraulic position actuator:

an engine control system for managing the operation of the engine, said engine control system generating at least a load output signal and an auxiliary load output signal;

a vehicle control communication system for sending and receiving signals from said operator input apparatus, said hydraulic pressure sensor, and said digital draft load controller; and said digital draft load controller connected to said vehicle control communications system to receive said engine control system load output signal, said at least one auxiliary load controller output signal, the pressure output signal and said desired draft load signal, the digital draft load controller programmed to derive an actual draft load value correspondingly to a horizontal component of an engagement force between the component and the ground from the pressure output signal using a proportional relationship between vertical forces on the implement and the draft load, wherein a balancing force balancing the vertical forces on the implement is calculated as a function of the cylinder fluid pressure, the vertical force and accordingly the proportional draft force can then be calculated from the balancing force, the controller configured to calculate from the engine control system load output signal, the at least one auxiliary load controller output signal, and the actual and desired draft load signals an implement position control signal and send the implement position control signal to said hydraulic position actuator to manage said implement position based on said position control signal whereby a substantially constant draft load is maintained on said tractor.

15. The improvement of claim 14, wherein said vehicle control communication system comprises a digital communication link connecting said digital draft load controller, said hydraulic pressure sensor, and said operator input apparatus.

16. The improvement of claim 15, wherein said digital draft load controller, upon receiving said pressure output signal from said vehicle control communication system, derives solely therefrom an actual draft load value, receives said desired draft load value from said vehicle electronic communication system and compares said actual draft load value to said desired draft load value, calculates an error signal based on the difference between said actual draft load value and said desired draft load value, generates an implement position control signal having a value, and sends said implement position control signal to said implement position actuator to manage said implement position based on said position control signal thereby causing said error signal to be substantially zero thereby maintaining a substantially constant draft load on said tractor.

* * * * *